P., J. & H. ROSENBAUM.
VEHICLE LOCK.
APPLICATION FILED FEB. 15, 1916.
1,201,765.
Patented Oct. 17, 1916.
2 SHEETS—SHEET 1.
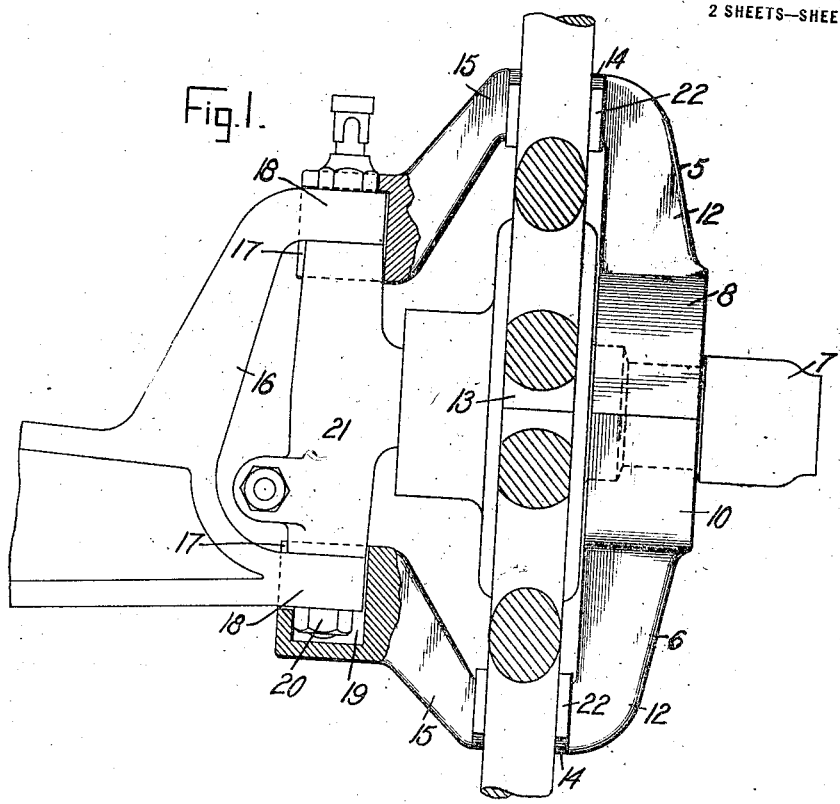
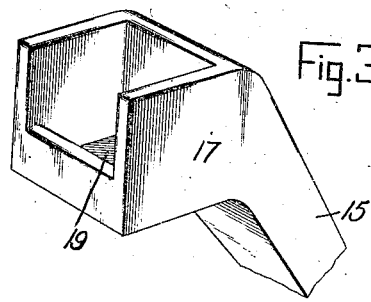
WITNESSES
INVENTORS
H. Rosenbaum
P. Rosenbaum
J. Rosenbaum
BY
ATTORNEYS

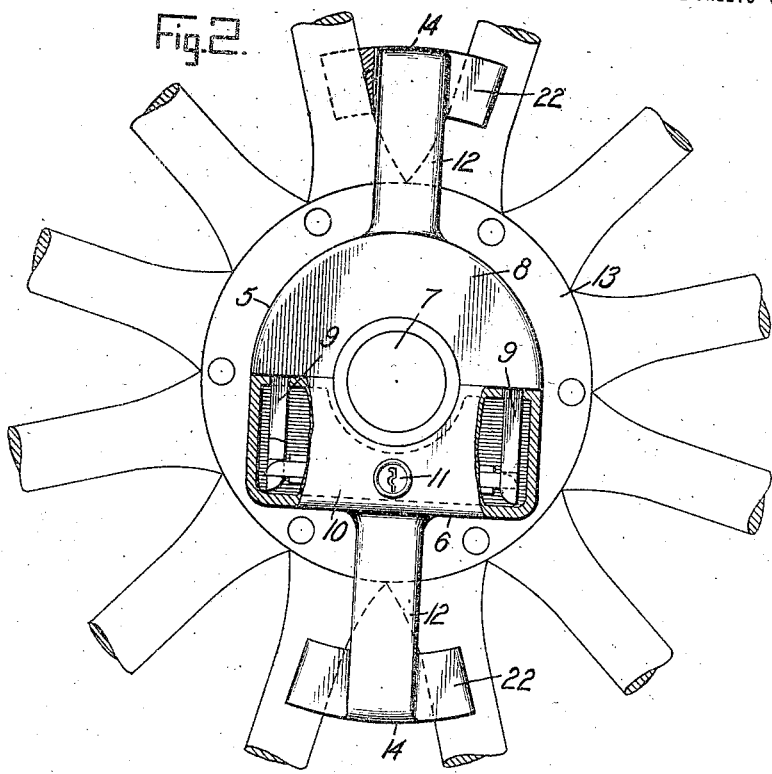
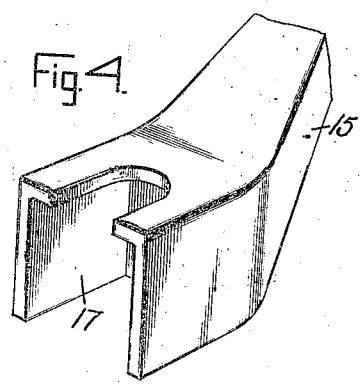

UNITED STATES PATENT OFFICE.

PHILIP ROSENBAUM, OF LAWRENCE, AND JACQUES ROSENBAUM AND HARRY ROSENBAUM, OF NEW YORK, N. Y.

VEHICLE-LOCK.

1,201,765.　　　　Specification of Letters Patent.　　Patented Oct. 17, 1916.

Application filed February 15, 1916. Serial No. 78,463.

*To all whom it may concern:*

Be it known that we, PHILIP ROSENBAUM, a citizen of the United States, and a resident of Lawrence, in the county of Nassau and State of New York, and JACQUES ROSENBAUM and HARRY ROSENBAUM, citizens of the United States, and both residents of the city of New York, borough of Bronx, in the county of Bronx and State of New York, have invented a new and Improved Vehicle-Lock, of which the following is a full, clear, and exact description.

Our invention relates to vehicle locks, and has reference more particularly to means for locking the wheel of a vehicle to prevent the rotation thereof.

The object of the invention is to provide a simple, strong, inexpensive and detachable lock which is adapted to secure the wheel to a non-rotatable part of the vehicle and prevent the vehicle from being driven away by an unauthorized person.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of the lock partially in section, shown as applied to prevent the rotation of a vehicle wheel; Fig. 2 is a front elevation of the lock partly in section to show the details of construction; Fig. 3 is a perspective view of the end socket of the lower lock member; and Fig. 4 is a perspective view of the end socket of the upper lock member.

Referring to the drawings, 5 and 6 are the two members forming the lock. They have a yoke for engaging the hub extension 7 of a wheel. The yoke portion 8 of the member 5 is provided with tongues 9 receivable by the yoke portion 10 of the lower member 6 wherein a key-operating mechanism 11 of any suitable type is provided for locking the tongues therein whereby the yoke portions 8 and 10 are locked together on the hub extension 7.

Each of the lock members has an arm 12 extending from its yoke portion radially toward the spokes of the wheel 13. At the spokes a portion 14 of the arm extends straight across the wheel spokes. Beyond the wheel, or on the rear side of the spokes, the portion 15 of the arm is directed downwardly toward the axle 16 of the vehicle. When the lock is designed for the front wheels of the vehicle, as illustrated, the portions 15 of the arms terminate in sockets 17 for engaging a knuckle bearing 18 of the axle. The socket 17 of the lower lock member 6 is recessed, as shown at 19 to receive a spindle nut 20 of the steering knuckle 21.

The portions 14 of the arms 12 have lateral projections 22 recessed to engage the adjacent spokes of the wheel, whereby when the two members 5 and 6 are locked on the hub extension the lock is prevented from axial displacement without moving the wheel therewith. But the movement of the wheel is prevented by the engagement of the lower socket 17 with the nut 20; consequently, the wheel cannot be taken off, even from the axle, without first removing the lock. Due to the peculiar engagement of the members 5 and 6 with the wheel and with each other, the lock cannot be pried open. It positively prevents the rotation of the wheel and thus affords a sure means for preventing an unauthorized person from tampering with the vehicle. To place the lock on the wheel, each member is introduced with its portion 14 between the spokes and the members are then moved toward the hub to be locked thereupon.

We claim:

1. In combination, a non-rotatable vehicle axle, a wheel thereon having a hub, and a lock secured to the hub and having means extending therefrom between the spokes of the wheel to engage the axle.

2. In combination, a non-rotatable vehicle axle, a wheel associated therewith, said wheel having a hub, and a lock secured to the hub of the wheel, said lock having arms extending across the wheel to engage the axle.

3. In combination, a non-rotatable vehicle axle, a wheel associated therewith, said wheel having a hub, a lock having yoke portions adapted to be secured to the hub of the wheel, and arms extending from said yoke portion between the wheel spokes to engage the axle.

4. In combination, a stationary vehicle part, a vehicle wheel having a hub, a lock adapted to be secured to the hub of the wheel and having means extending across the wheel to engage the stationary part of the vehicle.

5. In combination with a vehicle axle, a wheel associated therewith, said wheel having a hub, a lock having yoke portions adapted to be secured to the hub, and arms extending from said yoke portions toward and between the spokes of the wheel, said arms having means at the extremities thereof for engaging the axle.

6. In combination, a vehicle axle, a wheel associated therewith, a lock having yoke portions adapted to be secured on the hub of the wheel, and arms extending from the yoke portions toward the spokes and between the same, said arms having sockets at the ends thereof for engaging the axle, said arms having lateral projections recessed to engage the spokes between which the arms pass.

7. In combination, a vehicle axle, a wheel associated therewith, a lock having yoke portions for engaging the wheel hub, key-operating means in one of said hub portions for locking the other thereto, arms extending from each yoke portion toward the spokes of the wheel between the wheel spokes and toward the axle, said arms having means for engaging the axle, and lateral projections on said arms for engaging the spokes between which the arms pass.

8. In combination with a vehicle axle, a wheel associated therewith, a lock having yoke portions for engaging the hub of the wheel, key-operating means in one of the yoke portions for locking the other yoke portion thereto, an arm extending from each of said yoke portions toward the spokes of the wheel, a portion of each arm at the spokes extending between the spokes and downwardly toward the axle, and lateral projections on each arm where it passes across the wheel to engage the spokes of the wheel between which the arm passes, the extremity of said downwardly-extending portion of the arms having sockets for engaging the axle, one of said sockets being recessed to receive a projection from the axle, substantially as and for the purpose set forth.

9. As an article of manufacture, a vehicle lock comprising two members, each having a yoke portion adapted to engage the hub of a wheel, and key-operating means for one of said yoke portions for locking the other yoke portion thereto, each of said members having an arm extending radially from its yoke portion and bent to pass across the wheel to engage an axle associated with the wheel, the extremities of said bent portions having means for engaging the axle, said arms having lateral projections for engaging the spokes of a wheel.

In testimony whereof I have signed my name to this specification in the presence of two subscribing witnesses.

PHILIP ROSENBAUM.

Witnesses:
   SAMUEL ABRAHAMS,
   WM. S. ROTHCHILD.

In testimony whereof we have signed our names to this specification in the presence of two subscribing witnesses.

JACQUES ROSENBAUM.
HARRY ROSENBAUM.

Witnesses:
   HERMAN ROTHSTEIN,
   HANNAH G. KRIMON.